United States Patent
Tietsch et al.

(10) Patent No.: US 8,767,933 B2
(45) Date of Patent: Jul. 1, 2014

(54) METHOD FOR COMMUNICATION AND COMPONENTS IN A COMMUNICATIONS NETWORK

(75) Inventors: Michael Tietsch, Kaufering (DE); Karl Klaghofer, Munich (DE); Holger Prange, Munich (DE); Thomas Scharnagl, Perchtoldsdorf (AT)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 13/982,948

(22) PCT Filed: Mar. 2, 2011

(86) PCT No.: PCT/EP2011/001042
§ 371 (c)(1),
(2), (4) Date: Jul. 31, 2013

(87) PCT Pub. No.: WO2012/116713
PCT Pub. Date: Sep. 7, 2012

(65) Prior Publication Data
US 2013/0308768 A1    Nov. 21, 2013

(51) Int. Cl.
*H04M 3/42* (2006.01)
(52) U.S. Cl.
USPC ........................................ 379/201.01; 379/229

(58) Field of Classification Search
USPC ............................................. 379/201.01, 229
See application file for complete search history.

(56) References Cited

U.S. PATENT DOCUMENTS

| 2003/0037146 A1 | 2/2003 | O'Neill |
| 2008/0226049 A1 | 9/2008 | Kumar et al. |

FOREIGN PATENT DOCUMENTS

EP    2131562 A1    12/2009

OTHER PUBLICATIONS

Written Opinion of the International Searching Authority for PCT/EP2011/001042 dated Oct. 28, 2011 (Form PCT/ISA/237) (German Translation).
International Search Report for PCT/EP2011/001042 dated Oct. 28, 2011 (Forms PCT/ISA1220, PCT/ISA/210) (German Translation).
International Preliminary Report on Patentability and Written Opinion for PCT/EP2011/001042 dated Sep. 3, 2013. (English).
International Preliminary Report on Patentability and Written Opinion for PCT/EP2011/001042 dated Sep. 3, 2013. (German).

*Primary Examiner* — Quynh Nguyen
(74) *Attorney, Agent, or Firm* — Buchanan Ingersoll & Rooney PC

(57) ABSTRACT

With a method for communication in a communication network, a subscriber is assigned an authorization level depending on the respective applicable scenario at the time when the authorization level is assigned for that subscriber in that communication network.

20 Claims, 1 Drawing Sheet

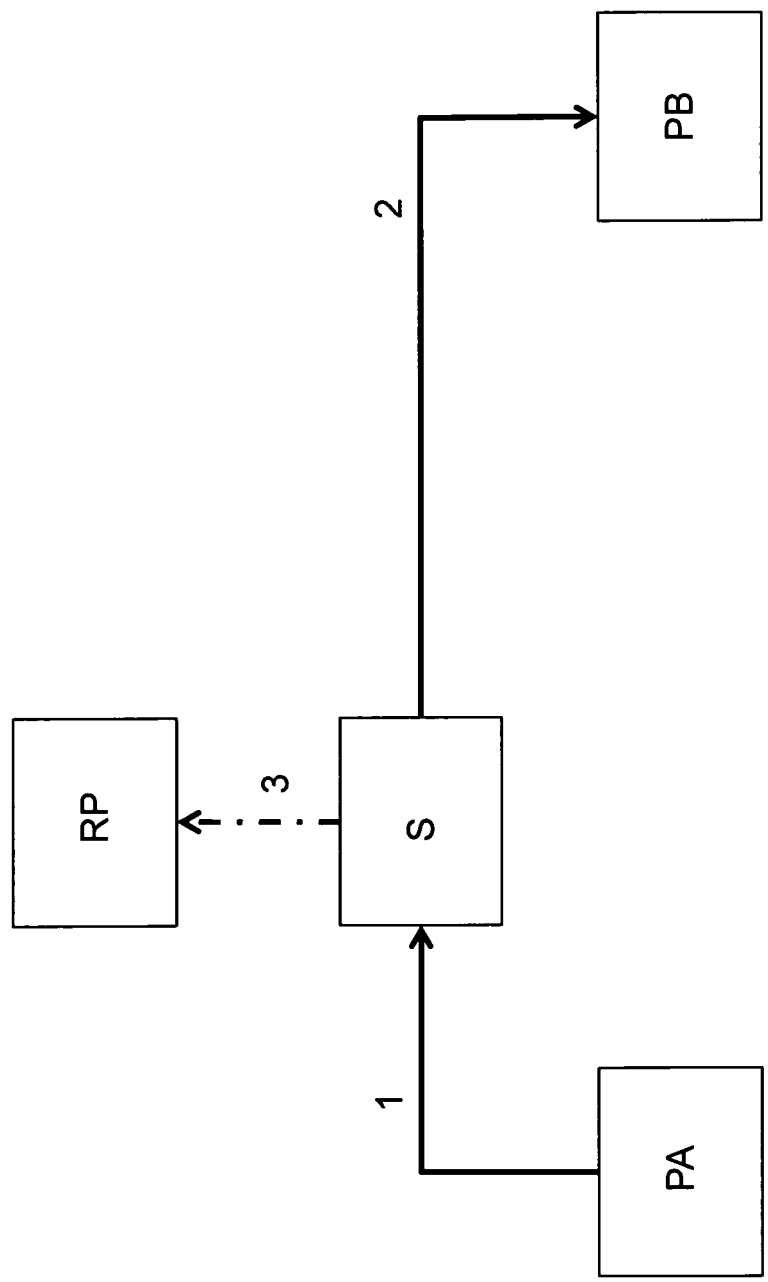

US 8,767,933 B2

METHOD FOR COMMUNICATION AND COMPONENTS IN A COMMUNICATIONS NETWORK

CROSS-REFERENCE TO RELATED APPLICATIONS

This application is the United States national phase under 35 U.S.C. §371 of PCT international patent application no. PCT/EP2011/001042, filed on Mar. 2, 2011.

BACKGROUND OF THE INVENTION

1. Field of the Invention

Embodiments relate to methods for communication and a respective component in support of such a method in a communication network, in particular in a company telephone network.

2. Background of the Related Art

To ensure adequate quality and connectivity of important calls in company telephone networks, if possible under all circumstances, authorization levels may be awarded to certain subscribers in traditional communication networks. For example, a particular subscriber A may be awarded a high authorization level, subscriber B a medium and subscriber C a low authorization level. Without additional measures, other subscribers in a company telephone network have no special authorization level.

If a first subscriber is in a conversation with a second subscriber, neither of those subscribers can be reached by a third subscriber as long as the conversation is active. The calling third subscriber must wait until that conversation is over. If, however, the calling third subscriber has a certain authorization level, such as a higher authorization level than the two subscribers that are parties to the conversation, then the active conversation is disconnected if the telephone network features the respective equipment, and the third subscriber with the corresponding higher authorization level can establish communication with the desired destination subscriber. When using authorization levels, this ensures that the destination subscriber is always made available to the subscriber with the higher authorization.

Furthermore, additional resources such as bandwidth capacity can be made available to a subscriber with the appropriate authorization level. Currently, the authorization level of a subscriber, that is, his authorization to make a call with a certain priority, is usually configured using a so-called softswitch and is often verified using authentication mechanisms suitable for that purpose. Usually, a subscriber is assigned an authorization level permanently, and changes to the authorization level of a subscriber require respective technical and administrative interventions. In case of shortages in terms of resources and bandwidth, such fixed assignments of authorization levels and bandwidths can lead to problems.

BRIEF SUMMARY OF THE INVENTION

We provide a method of communication or a component in a communication network is provided, where or by which a subscriber is assigned an authorization level depending on the respective applicable scenario at the time when the authorization level is assigned for that subscriber in that communication network. Thus, according to the invention, an authorization level is no longer assigned to a subscriber in a fixed manner under all circumstances, i.e., purely subscriber-specific; instead, according to the invention, the authorization level is assigned to the subscriber based on a scenario applicable to that subscriber at the time when the authorization level is assigned.

BRIEF DESCRIPTION OF THE FIGURES

FIG. 1 shows schematically, the sequence of the method according to the invention based on an embodiment of the invention.

BRIEF DESCRIPTION OF THE INVENTION

As noted above, we provide a method of communication or a component in a communication network is provided, where or by which a subscriber is assigned an authorization level depending on the respective applicable scenario at the time when the authorization level is assigned for that subscriber in that communication network. Thus, according to the invention, an authorization level is no longer assigned to a subscriber in a fixed manner under all circumstances, i.e., purely subscriber-specific; instead, according to the invention, the authorization level is assigned to the subscriber based on a scenario applicable to that subscriber at the time when the authorization level is assigned.

In this context, a communication network refers to any device that allows several subscribers to communicate with each other, preferably by transporting messages between subscribers participating in a communication process via a network, preferably via a digital data network or a telephone network.

In this context, an authorization level refers to an attribute that is assigned or allocated permanently or temporarily to a subscriber in a communication network, based on which the subscriber is granted access to resources or devices of the communication network. Different authorization levels preferably determine different priorities for giving subscribers who are provided with these authorization levels access to individual resources. Authorization levels therefore preferably correspond to priorities.

In this context, a scenario refers to a set of parameters, preferably logical, text-based or numerical parameters, that characterize a particular status of the communication network, the subscribers, an application environment in which the subscribers of the communication network act, or other relevant structures related to the communication processes that are carried out via the communication network. Examples of parameters for a scenario are the current location of a subscriber, such as a building or room number at a company site, GPS coordinates, etc., the occurrence of a certain event such as the failure of a production system, temporary functions of subscribers such as the function of a deployment manager or his assistant, or other similar parameters. A set of such parameters characterizes a scenario in this case, if this set of parameters is sufficient for assigning an authorization level to at least one subscriber in the sense that, for assigning an authorization level to said at least one subscriber, no additional information about the scenario is required. However, in case of an expansion of a parameter set by one or more additional parameters, this does not prevent different authorization levels from being assigned to one or more subscribers, because an extended set of parameters can potentially be a more realistic characterization of a scenario than the original set of parameters.

Such a scenario of characterizing parameters in this sense is taken into account for the allocation of an authorization level to a subscriber, preferably by evaluating these parameters using a component in a communication network. Such a component assigns an authorization level to a subscriber, preferably based on the scenario that is applicable at the time when the authorization level is assigned for that subscriber in that communication network. It is particularly preferred, in connection with this component, that a storage device be provided for storing parameters and scenario rules, as well as a processor device for determining authorization levels by automatic evaluation of the stored parameters and rules. Preferably, parameters are updated through transmission via communication devices and/or acquired by sensors and updated continuously. For example, the breakdown of a production system or of supply equipment or the occurrence of an emergency situation can be reported by transmission of preferably logical or numerical parameters of the evaluating component.

According to a preferred embodiment of the invention, with features that can also be combined with features of other embodiments, a method is provided, in which access to a resource in the communication network by a subscriber is enabled or restricted, depending on the authorization level of the subscriber when that resource is accessed. The advantage of this embodiment of the invention is that authorizations and therefore priorities are no longer applicable permanently for a subscriber, as is typical in the prior art, because they can be changed depending on certain scenarios, preferably independent of administrative actions.

Embodiments of the invention make it possible to assign mobile users a lower priority when they are in a certain local area with scarce resources, for example, with a low available bandwidth, or to give certain subscribers temporarily a higher priority, if there is sufficient bandwidth or in case of a special temporary function. Such measures can effectively support the deployment of emergency personnel, a company accident department or fire fighters in case of accidents, for example. Based on external events such as a fire, fire alarm or emergency alert, flexible re-allocation of priorities can effectively support emergency units. The invention allows for dynamic, time-flexible allocation of authorization levels, preferably based on rules or other parameters such as locations.

When allocating authorization levels via a softswitch, the invention makes it possible to assign authorization levels to certain subscribers context-specifically. In such cases, the context is preferably determined by the location of the caller, by company rules or by the occurrence of certain events or by parameters of other scenarios.

A softswitch is a network component for modern communication networks that offer, for example, IP telephony as a service (http://de.wikipedia.org/wiki/Softswitch). In such a network, a softswitch assumes control of the media gateways and the necessary signaling. It is the central functional component to control the "intelligence" of the network. In a narrower sense, the softswitch also includes devices that integrate the function of the media gateway.

The term softswitch comes from the software that is used in a softswitch to execute the central control of the switching tasks, which are performed by a switch in traditional telephony. For reasons of reliability, the software is preferably installed on fault-tolerant servers and preferably also handles call control. Despite its name, a softswitch is generally not a pure software solution. To realize a so-called carrier-grade softswitch actually requires a substantial hardware investment.

The switching tasks of a softswitch include functions of protocol conversion and authorization, and management functions of administration and accounting. These functions are required for routing voice calls between different network types, and for resource and bandwidth management, which needs to ensure adequate service quality.

To implement the invention, a component is provided that supplies parameters of scenarios as input parameters, such as location information of communication subscribers, the company's infrastructure, preferably with all available branches, branch locations or subsidiaries and access bandwidths, or so-called scenario profiles. Preferably, the rules that apply to certain events or scenarios are stored in this component.

In the case of a call by a particular subscriber, the softswitch preferably contacts the authorization level component to obtain the current authorization level of the calling subscriber. This component can be realized advantageously as a separate service or server, or even as an internal component of the softswitch. The above-mentioned scenarios can be, for example: "Company fire department deployed," "failure of a WAN connection" or "emergency number has been called," or other scenarios with the goal of assigning different authorization levels to a particular group of subscribers, depending on certain circumstances. Thus, in emergency scenarios, emergency personnel would receive a higher or the highest priority, while the authorization level of other subscribers would be downgraded accordingly.

The authorization level component, provided according to one preferred embodiment, preferably determines first the location of the subscriber, either directly via location by value or via location by reference using a respective central location information service (LIS).

Location information can be obtained either directly, via transmission of coordinates or other location information ("location by value"), for example by transmitting a so-called "presence information data format location object" (PIDF-LO) according to RFC4119, or indirectly via transmission of a reference ("location by reference"), for example according to RFC5808. Such a reference is preferably provided in the form of a so-called "Location URI".

A Uniform Resource Identifier (URI) is an identifier and consists of a string of characters that is used to identify an abstract or physical resource. URIs are used to identify resources (such as Web pages, miscellaneous files, call-up of web services, but also, for example, e-mail recipients) on the Internet and especially the WWW. URIs can be integrated as strings of characters (encoded with a character set) into digital documents, especially those in HTML format. Internationalized Resource Identifiers (IRIs) are an extension of existing URIs, which consist only of printable ASCII characters.

Preferably, the necessary information is retrieved from a company network or from phones connected to such a network or from other terminal units in that network. A certain authorization level is computed based on the location and on the scenario profiles, preferably via internal business logic, and is communicated to the softswitch. Furthermore, this component preferably stores all assigned authorization levels to obtain an accurate reflection of the resources assigned within the company network.

If the priority requirements of a call do not meet the rules set for the subscriber, the softswitch configured according to the invention responds preferably in two ways:
  The call is terminated.
  The call is "reclassified" according to the rules, for example by assigning a new priority to the call, and preferably a response about the new priority is sent to the calling phone to inform the caller accordingly. The call is then preferably carried out with the newly assigned priority. This can be done, for example, by using the SIP protocol via the messages "180 Ringing" or "200 OK".

According to other embodiments of the invention, the authorization level component could communicate with a Network Access Control (NAC) service of the company network in order to obtain an accurate overview of all network devices logged into and preferably also authorized in the network. Preferably, such an overview includes information about the switch port, the IP address, the device type, or the necessary bandwidth and similar information.

According to the invention, granting of authorization levels or priorities for certain phone calls and certain subscribers will be controlled preferably via a central component. Also subscribers at a particular location, for example subscribers in a building within a building complex or in the company's headquarters, can then receive authorization levels dynamically in a company network if the respective scenarios are present. A central authorization level component preferably processes subscriber location information, bandwidth information, the company's infrastructure, or other parameters of scenarios to determine certain authorization levels depending on current scenarios, with the objective of enabling really important calls for a given situation or enabling them with a certain level of service.

According to a preferred embodiment of the invention with features that can also be combined with features of other embodiments, a method is provided in which a conflict in accessing a resource in the communication network by at least two subscribers is resolved based on the authorization levels of those subscribers when that resource is accessed. In contrast to known solutions, where access conflicts to resources are solved with static authorization levels that are assigned permanently to subscribers, the invention allows for the solution of access conflicts to resources depending on the respective situation and the authorization levels granted in real time and the resultant priorities, for example dependent on current functions performed by subscribers.

According to a preferred embodiment of the invention with features that can also be combined with features of other embodiments, a method is provided in which at least one resource is a connection to at least one other subscriber, or a data rate or bandwidth available with that connection. This embodiment of the invention offers the advantage that resources such as bandwidth or data rates, which are required for carrying out resource-intensive forms of communication such as video conferencing, can be allocated flexibly with regard to time and according to currently existing scenarios.

According to a preferred embodiment of the invention with features that can also be combined with features of other embodiments, a method is provided in which a scenario is defined by at least one parameter that designates a subscriber location. The advantage of this embodiment of the invention is that the authorization level of a subscriber can be changed simply through a change in the subscriber's location where that subscriber intends to initiate a call. Thus, a certain subscriber who normally has a low authorization level can receive a higher authorization level by using a terminal in an emergency call center or in a company's headquarters. This can happen independently of the use of a fixed terminal, for example by the fact that when using a mobile device belonging to the subscriber, its current location is determined and the current authorization level of the subscriber is changed because that subscriber intends to initiate a call from a location based on which the caller is assigned a higher authorization level because it is so stipulated in relevant business rules, for example.

According to a preferred embodiment of the invention with features that can also be combined with features of other embodiments, a method is provided in which a scenario is defined by at least one parameter that designates the occurrence of an event. Examples of such events are disasters, accidents, exceptional circumstances, infrastructure collapse.

According to a preferred embodiment of the invention with features that can also be combined with features of other embodiments, a method is provided in which at least one authorization level in a scenario is determined by evaluating at least one rule applicable to this scenario.

According to a preferred embodiment of the invention with features that can also be combined with features of other embodiments, a method is provided in which, in order to enable or restrict a subscriber's access to a resource, the current authorization level of the subscriber is queried by a component of the communication network and said component carries out the assignment of the authorization level.

According to a preferred embodiment of the invention with features that can also be combined with features of other embodiments, a component is provided in which a memory device for storing parameters and rules of scenarios is provided, and a processor device is provided for determining authorization levels through automatic evaluation of stored parameters and rules.

With the method according to the invention for communication in a communication network, a subscriber is assigned an authorization level depending on the respective applicable scenario at the time when the authorization level is assigned for that subscriber in that communication network. In the embodiment illustrated in FIG. 1, the authorization level of subscriber A, who uses the telephone PA to call the subscriber B at the phone PB, is assigned when the connection is made via a SIP server S using a component RP. The telephone PA of the subscriber A signals 1 the desire to set up the call to the SIP server S. Preferably, the terminal PA also communicates to the SIP server S the location where the terminal PA is located when the call is placed.

In the "resource priority component" RP or in a storage device accessible to it, preferably a rule is stored which means that this call receives the priority level or authorization level "5" if the subscriber A calls from location "a". Since the premise of this rule is satisfied (A calls from location a), the call receives the priority level or authorization level "5" in response to an inquiry 3 of the SIP server S to the component RP. The SIP server S now places 2 the call from A on the device PA to B on the device PB with that priority level or authorization level "5" for 2.

We claim:

1. A method for communication in a communication network, comprising:
   a central device of the network assessing an applicable scenario for an authorization level; and
   the central device assigning a subscriber an authorization level dynamically depending on the applicable scenario at a time when the authorization level is being assigned for the subscriber in the communication network such that the authorization level is not assigned to the subscriber in a fixed manner so that the assignment of the authorization level is assigned to the subscriber based on conditions within the network at the time the authorization level is being assigned, the conditions within the network at the time the authorization level is being assigned comprising:
      a determined location of the subscriber at the time the subscriber is using a device to access the network to facilitate communications,
      all previously assigned authorization levels for use of resources of the network at the time of the assignment of the authorization level, and
      bandwidth availability within the network at the time of the assignment of the authorization level.

2. The method of claim 1, further comprising:

the central device preventing access to a resource in the communication network of a device of the subscriber when the authorization level of the subscriber is below what is needed for access to that resource of the network when the device of the subscriber attempts to access the resource; and the central device enabling access to the resource of the network to the device of the subscriber when the authorization level of that subscriber meets requirements needed for access to the resource when the resource is attempted to be accessed.

3. The method of claim 2, comprising resolving a conflict in accessing a resource in the communication network by at least two subscribers depending on the authorization levels of those subscribers when that resource is accessed.

4. The method of claim 2 wherein at least one resource is selected from the group consisting of a connection to at least one other subscriber, a data rate, and bandwidth available to that connection.

5. The method of claim 1, comprising defining a scenario by at least one parameter that designates a subscriber location.

6. The method of claim 1, comprising defining a scenario by at least one parameter that designates an occurrence of an event.

7. The method of claim 1, comprising the central device determining the authorization level to assign to the subscriber based on a detected scenario by evaluating at least one rule applicable to that scenario.

8. The method of claim 2, further comprising, to enable or restrict the subscriber's access to a resource, querying a current authorization level of the subscriber by a component of the central device of the communication network, wherein said component carries out assignment of the authorization levels.

9. A component in a communications network configured to implement the method of claim 1.

10. The component of claim 9, further comprising a memory device for storing parameters and rules for assessing scenarios for assigning authorization levels, each of the scenarios defined by at least one parameter relating to at least one of the conditions, and a processor device for determining authorization levels through automatic evaluation of the stored parameters and rules.

11. The method of claim 1, wherein the conditions also comprise whether the subscriber is utilizing a mobile device to access the network, wherein use of a mobile device results in the subscriber receiving a pre-defined authorization level that is lower than authorization levels assigned to users that utilize resources of the network via a non-mobile device.

12. The method of claim 1, wherein the central device is comprised of a switch device.

13. The method of claim 1, wherein the central device is comprised of a Session Initiation Protocol (SIP) server.

14. The method of claim 1, wherein the central device is a softswitch component of the network.

15. The method of claim 1, wherein the authorization level is assigned in response to the subscriber attempting to use a device to utilize the network to form a voice communication connection with a communication device, the authorization level being assigned prior to the device being utilized by the subscriber being connected to the communication device to form the voice communication connection, and wherein the method further comprising:

the central device connecting the device of the subcriber with the communication device to form the voice communication connection such that the voice communication connection has a quality level that is associated with the authorization level assigned to the subscriber.

16. The method of claim 1, wherein the authorization level is also assigned based on an employment condition associated with the subscriber.

17. The method of claim 1, further comprising:

the central device communicating with a storage device having data relating to at least one of the conditions stored thereon to assign the authorization level to the subscriber.

18. The method of claim 1, further comprising:

in response to a detection of network utilization made by the device of the subscriber that do not meet rules associated with the authority level assigned to the subscriber, the central device performing one of: assigning a new priority to the subscriber and terminating an attempt to connect to another device initiated by the device of the subscriber.

19. The method of claim 1, comprising:

in response to detecting an attempted call by the device of the subscriber that is associated with an emergency after assigning the authorization level to the subscriber, the central device connecting the attempted call at a priority level that is higher than a priority level that is associated with the authorization level assigned to the subscriber.

20. The method of claim 1, comprising:

in response to detecting an attempted call by the device of the subscriber that is associated with an authorization level that is greater than the authorization level assigned to the subscriber, the central device terminating the attempted call.

* * * * *